United States Patent [19]

Tancrell et al.

[11] 4,075,483
[45] Feb. 21, 1978

[54] MULTIPLE MASKING IMAGING SYSTEM

[75] Inventors: Roger H. Tancrell, Cambridge; William W. Stoner, Watertown; David T. Wilson, Billerica, all of Mass.

[73] Assignee: Raytheon Company, Lexington, Mass.

[21] Appl. No.: 704,138

[22] Filed: July 12, 1976

[51] Int. Cl.² .............................................. G01T 1/20
[52] U.S. Cl. ............................... 250/363 S; 250/366; 250/368
[58] Field of Search ...................... 250/363 S, 366, 368

[56] References Cited
U.S. PATENT DOCUMENTS

| | | | |
|---|---|---|---|
| 3,748,470 | 7/1973 | Barrett | 250/363 |
| 3,916,198 | 10/1975 | Coltman et al. | 250/363 S |
| 3,961,191 | 6/1976 | Stoner et al. | 250/368 X |

Primary Examiner—Archie R. Borchelt
Attorney, Agent, or Firm—David M. Warren; Milton D. Bartlett; Joseph D. Pannone

[57] ABSTRACT

An imaging system utilizing a scintillation camera for photographing subjects emitting gamma and X-radiation. Masks are sequentially positioned between the subject and the camera to produce a sequence of shadowgrams upon the face of the camera. Output signals of the camera are summed together to give an array of sum signals, the array of sum signals being Fourier transformed followed by a matched filtering by multiplication of the frequency terms by an array of factors utilized in generating the masks. Phase factors are applied to the camera output signals, either before the Fourier transformation or during the matched filtering, the phase factors identifying the masks utilized in producing the respective shadowgrams. An inverse Fourier transformation then results in an image of the subject.

23 Claims, 10 Drawing Figures

MULTIPLE MASKING IMAGING SYSTEM

BACKGROUND OF THE INVENTION

Imaging systems for use with gamma and X-radiation have been built with a scintillation camera and a mask as disclosed in the U.S. Pat. No. 3,748,470 which issued in the name of H. H. Barrett on July 24, 1973, and with a plurality of masks from a common family of masks such as Fresnel masks as is disclosed in the United States Pat. No. 3,961,191 which issued in the names of W. W. Stoner et al on June 1, 1976. While such systems are capable of producing images of a subject, it is desired to produce images of still higher quality. However, the coded images or shadowgrams produced on the scintillation camera result from a non-diffracting situation in which the radiation is not diffracted by the mask. In contrast to a lens, or Fresnel plate utilized as a lens, as are customarily employed in optical situations wherein diffracted radiation can be described mathematically by complex numbers having both amplitude and phase data, the non-diffracted radiation provides only amplitude data with an attendant increase in the difficulty of image reconstruction.

SUMMARY OF THE INVENTION

The aforementioned problem is overcome and other advantages are provided by an imaging system which, in accordance with the invention, introduces complex numbers having both amplitude and phase data to shadowgrams produced by non-diffracting radiation, these complex numbers being applied in the form of weighting factors or phase factors to the signals produced by the scintillation camera prior to the reconstruction of an image therefrom. In one embodiment of the invention, a mask assembly having three different Fresnel patterns spaced apart at 120° angles around the center of the mask is utilized, such a mask assembly being disclosed in FIG. 6 of the aforementioned Stoner patent. The three Fresnel patterns utilize the same mathematical generating formula but differ from each other by a factor of 120° in the argument of the formula, thus, the three Fresnel patterns are identified by phase factors of 0°, 120° and 240°. Individual ones of the Fresnel patterns are selected by rotation of the mask assembly. A second embodiment of the invention utilizes a spiral in which the spacing between opaque and transparent portions of the mask as measured along any one radius bear the same relationship as do the opaque and transparent portions of a Fresnel mask, the relationship for different radii being that of different Fresnel patterns, a rotation of the spiral mask by successive increments of 120° introducing phase factors of 0°, 120° and 240°.

The X and Y coordinate axis signals of the scintillation camera representing the points of impingement of radiation thereupon, are converted to digital numbers by analog-to-digital converters having a predetermined number of steps or bits of quantization, the number of bits in the X and Y coordinate signals corresponding to the rows and columns of an array of data points to be stored. The Z axis signal from the scintillation camera representing the presence of a quanta of radiant energy impinging upon a point of the face of the camera is multiplied by a phase factor, the same phase factor being applied to each Z axis signal obtained with an individual one of the Fresnel masks of the series of three Fresnel masks, or with a single position of the series of three positions of the spiral mask. The Z axis signals obtained for a second mask of the series of Fresnel masks, or for a second position of the spiral mask, are each multiplied by a second of the phase factors, while the Z axis signals obtained for the third Fresnel mask or the third position of the spiral mask are each multiplied by the third phase factor. If desired, four Fresnel masks differing by 90° may be utilized or six Fresnel masks differing by 60° may be utilized with corresponding phase factors being applied to the Z axis data from the camera. Similarly, successive shadowgrams may be obtained for smaller increments of rotation of the spiral mask, for example, 90° rotations or 60° rotations or even increments of 1°, with corresponding phase factors being applied to the Z axis signals from the camera.

In a first embodiment of the invention, the array of stored signals obtained with one of the maskings, a mask of the Fresnel set or a specific position of the spiral mask, with its corresponding phase factor weighting is summed with the arrays of weighted signals obtained from the subsequent maskings to provide an array of sum signals wherein each sum signal of the array is a complex number including a phase factor which is of the same form as that which is obtained in optics by the illumination of a Fresnel plate by visible diffracting light. Thus, the shadowgrams produced by non-diffracting radiation have now been replaced by a set of complex numbers which are of the same form as those which are obtained when a Fresnel plate is used for imaging by visible diffracting radiation. This permits the use of computational techniques, including Fourier transformation and matched filtering for producing higher quality images of the subject than has heretofore been possible.

The array of weighted sum signals is applied to a transformer which produces a Fourier transformation of the array, the resulting transformed array having the same number of data points as the array of sum signals. The transformed array is then filtered by multiplying each term of the array by complex factors utilized in the mathematical description of a Fresnel mask or of a spiral mask. Additional filtering is also utilized, such as a bandpass filtering, to enhance the outline of the image or to reduce the effects of noise outside the bandwidth of interest. Thereafter, an inverse Fourier transformation is performed followed by the extraction of the magnitudes of the complex numbers to produce a visible image of the subject.

In a second embodiment of the invention, the phase factors are inserted in the filtering operation following the Fourier transformation. The filtering operation takes the form of three matched filters, each of the three filters being matched, respectively, to individual ones of the Fresnel masks, or the three positions of the spiral mask.

In addition to the Fresnel and spiral masks referred to herein above, other mask patterns may be utilized, in particular, a pseudo-random pattern, a Barker code pattern, and a pattern in the form of a Hadamard matrix, the Hadamard coding being described in a book entitled "Transmission of Information by Orthogonal Functions" by H. F. Harmuth published in 1952 by Springer Verlag of New York, New York. The use of these alternative patterns follows a procedure similar to that outlined above for the Fresnel and spiral patterns. A set of three or more patterns is utilized wherein each pattern of the set differs slightly from the other patterns while retaining the same overall format. For example, where a pseudorandom pattern is to be utilized, the set of three pseudorandom patterns may be obtained by a maximal length shiftregister code wherein each of the three patterns is a portion of the overall maximal-length shift-register code.

BRIEF DESCRIPTION OF THE DRAWINGS

The aforementioned aspects and other features of the invention are explained in the following descriptions taken in connection with the accompanying drawings wherein.

DESCRIPTION OF THE PREFERRED EMBODIMENT

Figure 1:
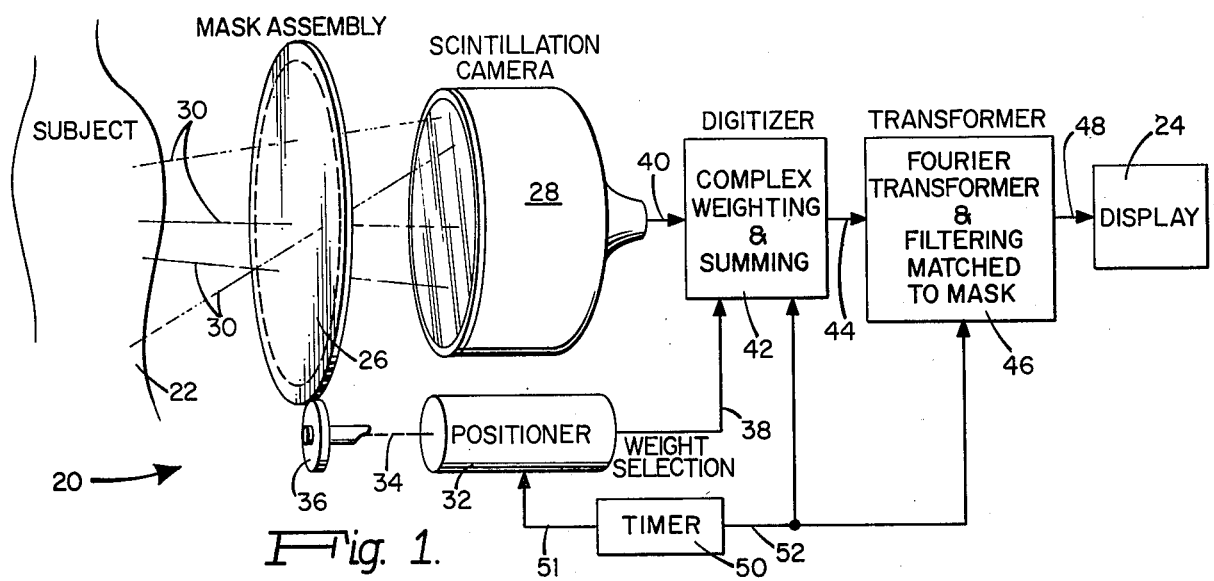
FIG. 1 is diagrammatic representation of an imaging system in accordance with the invention

Referring now to FIG. 1 there is seen a system 20 which, in accordance with the invention, forms an image of a subject 22 upon a display 24. The system 20 includes a mask assembly 26 positioned in front of a scintillation camera 28 and rotated about an axis parallel to the axis of the camera 28 to provide successively different masks, or positions of a mask, to radiation propagating along rays 30 from the subject 22 to the camera 28. Rotation of the mask assembly 26 is accomplished by means of a positioner 32 which includes a motorized drive (not shown) mechanically coupled via dashed line 34 to a pinion 36 which meshes with the circular periphery of the mask assembly 26 for imparting rotation thereto. The positioner 32 provides a signal on line 38 representing the orientation of the mask assembly 26.

The camera 28 is responsive to gamma and X-radiation and is structured in the manner taught by the U.S. Pat. No. 3,011,057 which issued in the name of H. O. Anger on Nov. 28, 1961, and also in the form taught by U.S. Pat. No. 3,914,611 which issued in the name of K. J. Stout on Oct. 21, 1975, the collimators disclosed in the Anger and Stout patents being replaced with a mask of the mask assembly 26 in the manner taught by the aforementioned Barrett Patent. As is taught in the Barrett patent, a mask of the mask assembly 26 produces a scrambled or coded image of the subject 22 upon the face of the camera 28. In response to radiation from a single point of the subject 22, the scrambled image becomes a well-defined shadow of the mask, the mask being sufficiently thin relative to the cross-sectional dimensions of the transparent regions thereof to permit diverging and converging rays of radiation to pass through the transparent regions. This is in contrast to a collimator of the aforementioned Anger patent which permits such rays to propagate only along prescribed directions. The selective variation in intensity of such rays as a function of their locations relative to the subject and mask, as produced by the mask, is referred to as spatial modulation. In the case of shadow, produced by a Fresnel plate, a spiral zone plate, or other shaped plate suitable for imaging, a composite of such shadows cast by radiation from a plurality of points within the subject 22 upon the camera 28 will be referred to hereinafter as a shadowgram because of its image forming properties, as will be disclosed hereinafter, which are analogous to the image forming properties of a hologram.

The analog signals produced by the camera 28 in response to incident radiation are coupled via line 40 to a digitizer 42 which converts these signals to an array of complex numbers having both amplitude and phase information, the complex numbers being obtained by multiplying the Z axis signals of the camera 28 by complex weighting factors or phase factors as selected by signals on line 38. Individual Z axis signals having the same X and Y coordinate locations in the shadowgrams are summed together by the digitizer 42 to produce the array of complex numbers. Output signals of the digitizer 42 representing these complex numbers are coupled via line 44 to a transformer 46 which provides Fourier transformation and matched filtering to the array of complex numbers to produce an array of image points suitable for the displaying of an image, the image points being coupled from the transformer 46 via line 48 to display 24. The operation of the positioner 32, digitizer 42 and transformer 46 are governed by timing signals provided by a timer 50 on lines 51 and 52.

Figure 2:
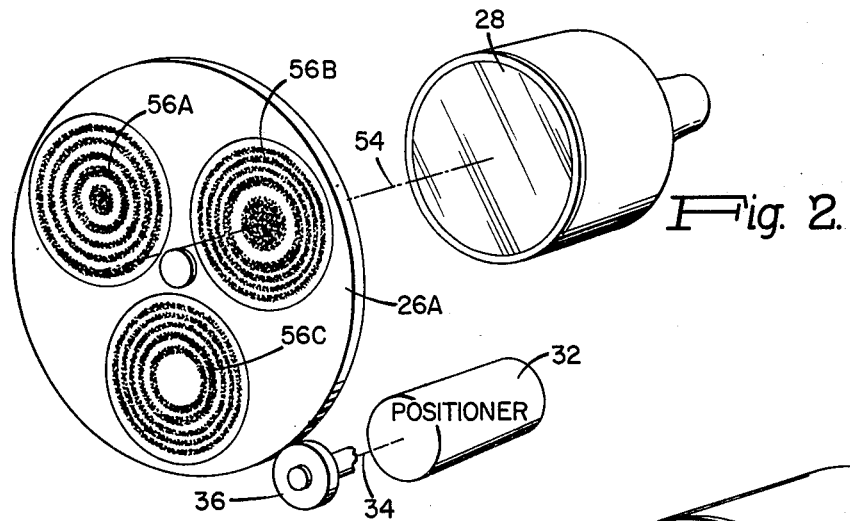
FIG. 2 shows a Fresnel mask assembly for use with the imaging system of FIG. 1.
Figure 6:
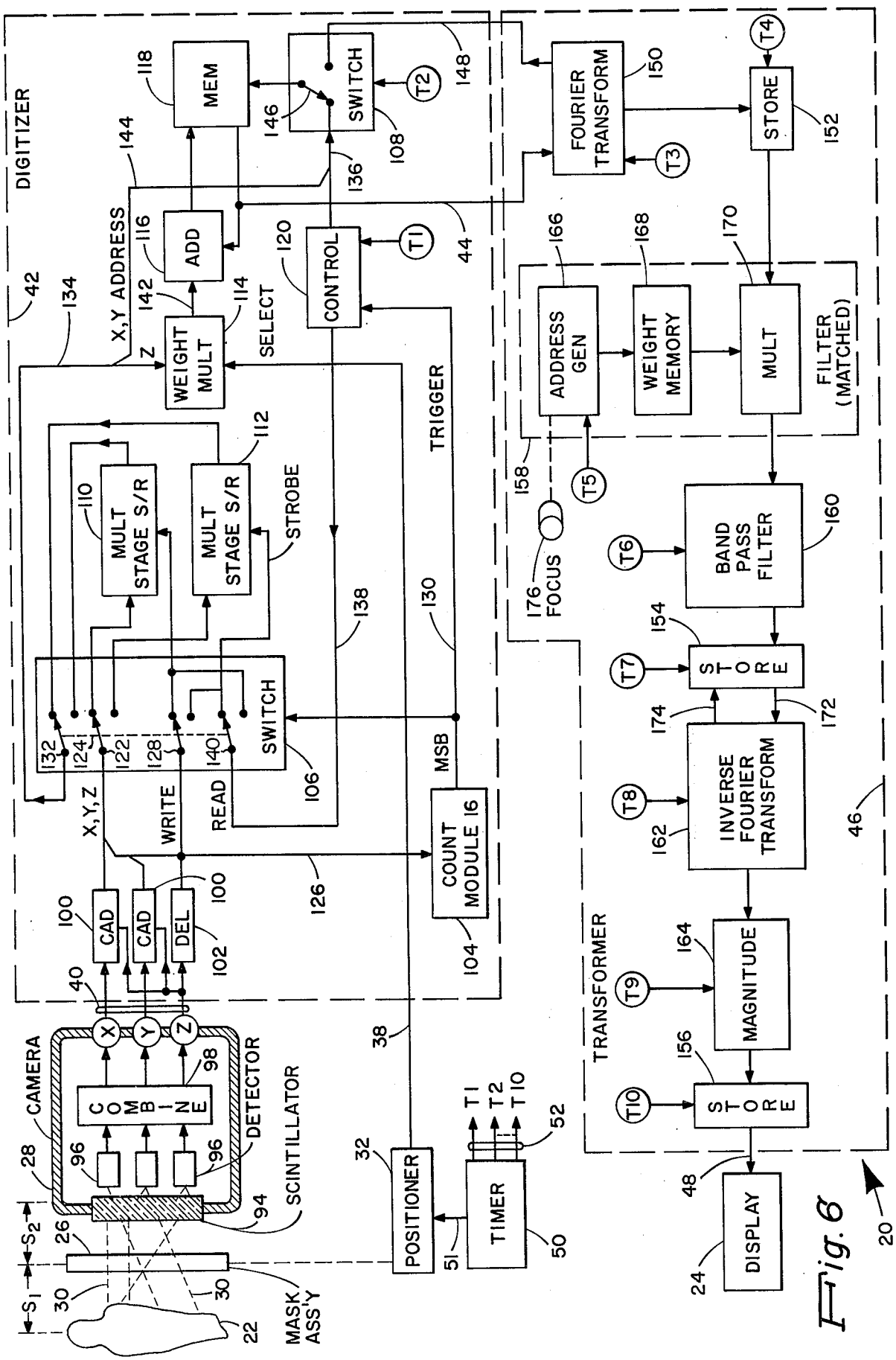
FIG. 6 is a detailed block diagram of the system of FIG. 1.

Referring now to FIG. 2, there is shown a form of the mask assembly 26 of FIG. 1, the form depicted in FIG. 2 being identified by the legend 26A and is positioned to intercept the axis 54 of the camera 28. The mask assembly 26A has a set of three Fresnel masks or zone plates 56, individual ones thereof being further identified by the legends A-C, in which the corresponding radii of a second and third of the plates 56 are seen to be shifted in length from a first of the plates by respectively 120° and 240° of a parameter (to be described hereinafter) which is analogous to the wavelength utilized in the optical generation of Fresnel masks. Such a set of masks is shown in FIG. 6 of the aforementioned Stoner patent. The center of the mask assembly 26A is offset from the axis 54 of the camera 28 so that the axis 54 passes successively through the centers of each of the zone plates 56A-C as they are successively positioned by the positioner 32 in front of the camera 28.

Figure 3:
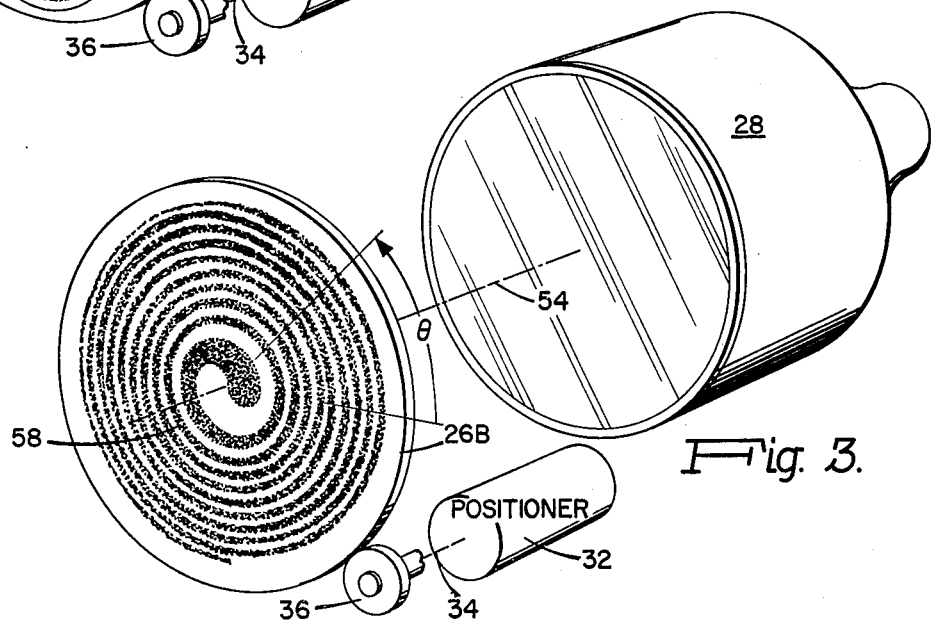
FIG. 3 shows a spiral mask assembly for use with the imaging system of FIG. 1.

Referring now to FIG. 3, there is shown an alternative form of the mask assembly 26 of FIG. 1, the form shown in FIG. 3 being identified by the legend 26B and having a zoneplate 58 constructed in the form of a single spiral plate in which the regions opaque to the radiation from the subject 22 become narrower and narrower with increasing radii, with the spaces therebetween, transparent to the radiation, becoming narrower and narrower in accordance with the widths and spacings of the opaque and transparent regions of a zone plate 56 of FIG. 2. It is understood that a family of zone plates 58 may be generated by utilizing a two-armed spiral, a three-armed spiral or other multiplied armed spirals (not shown) as such spirals are believed to produce shadowgrams suitable for imaging as does the spiral 58 of FIG. 3. It is noted that both the zone plate 58 as well as the zone plates 56 have symmetry about their respective centers which facilitates the generation of an array of complex numbers for processing a shadowgram in a manner following the imaging operation of a Fresnel plate in the optical situation wherein visible light is diffracted by the Fresnel plate.

Figure 4:
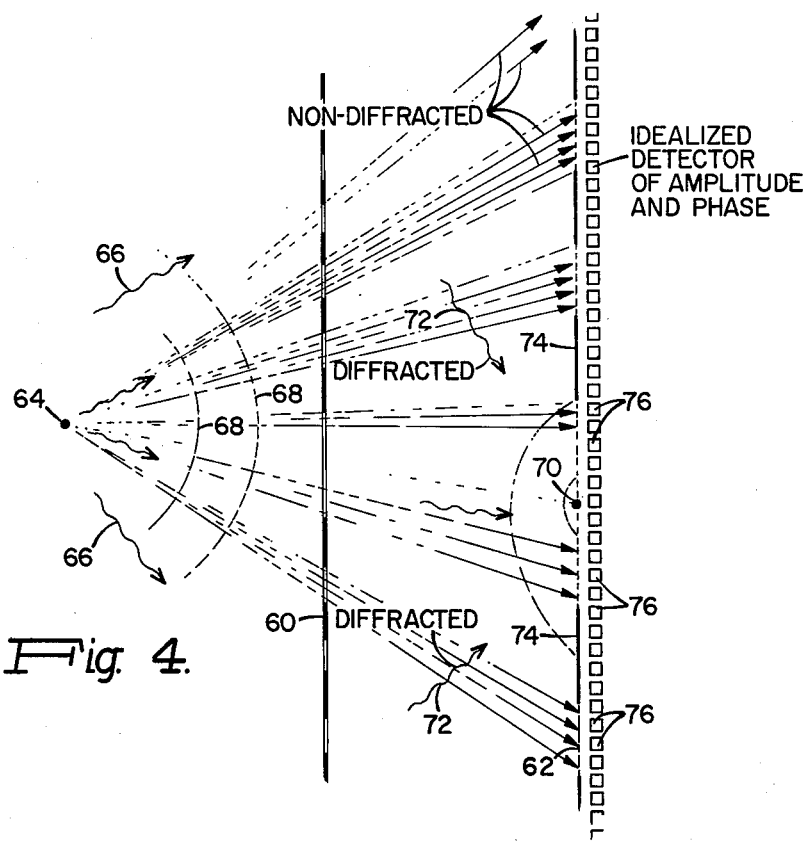
FIG. 4 demonstrates, diagrammatically, the difference between diffracting and non-diffracting radiation propagating through a Fresnel mask and impinging upon an image plane.

Referring now to FIG. 4, a zone plate 60 is represented schematically and positioned in front of an image plane 62 for demonstrating a distinction between diffracting and nondiffracting radiation. A point source 64 of radiation radiates radiation along the arrows 66 and via the wavefronts 68 in a plurality of directions. When the point source 64 radiates radiation in the visible spectrum, the radiation is diffracted by the zone plate 60 to image at an image point 70 located on the image plane 62. The diffracted radiation is represented by the arrows 72. In the situation wherein the point source 64 radiates gamma or X-radiation, there is no diffraction and the rays of radiation go straight through the transparent regions of the zone plate 60 to cast shadows 74 of the opaque regions of the zone plate 60, the shadows 74 being cast upon the image plane 62. FIG. 4 also shows an array of idealized detectors 76 of radiant energy, it being presumed for purposes of illustration that the idealized detectors 76 are capable of ascertaining both the phase and amplitude of radiation incident upon the image plane 62. Thus, in the situation wherein the point source 64 radiates visible radiation, the array of detectors 76 presents an array of complex numbers representing both the phase and amplitude of the incident radiation while, in the situation wherein the point source 64 radiates non-diffracting X or gamma radiation, the array of detectors 76 presents only amplitude data since no phase data is present. In particular, it is noted that, in the case of X and gamma radiation, the coherence distance of such radiation is too short to permit a measurement of phase. Furthermore, it is noted that the phase data presented by the diffracted visible radiation at the image point 70 is seen to be a composite of the vectorial addition of wavelets emanating from the various transparent regions of the zone plate 60, this being in contrast to the nondiffracting case of gamma radiation wherein a point, such as the image point 70, is illuminated by a single ray traveling in the straight line from the point source 64 to the image point 70. In summary, therefore, it is noted that the array of detectors 76 produces an array of numbers representing both phase and amplitude data while, in the case of non diffracting radiation, these detectors 76 produce only amplitude data. As has been noted hereinabove, a feature of the invention is the obtaining of an array of numbers representing both amplitude and phase data for the case of non-diffracting radiation such as X and gamma radiation.

Figure 5:
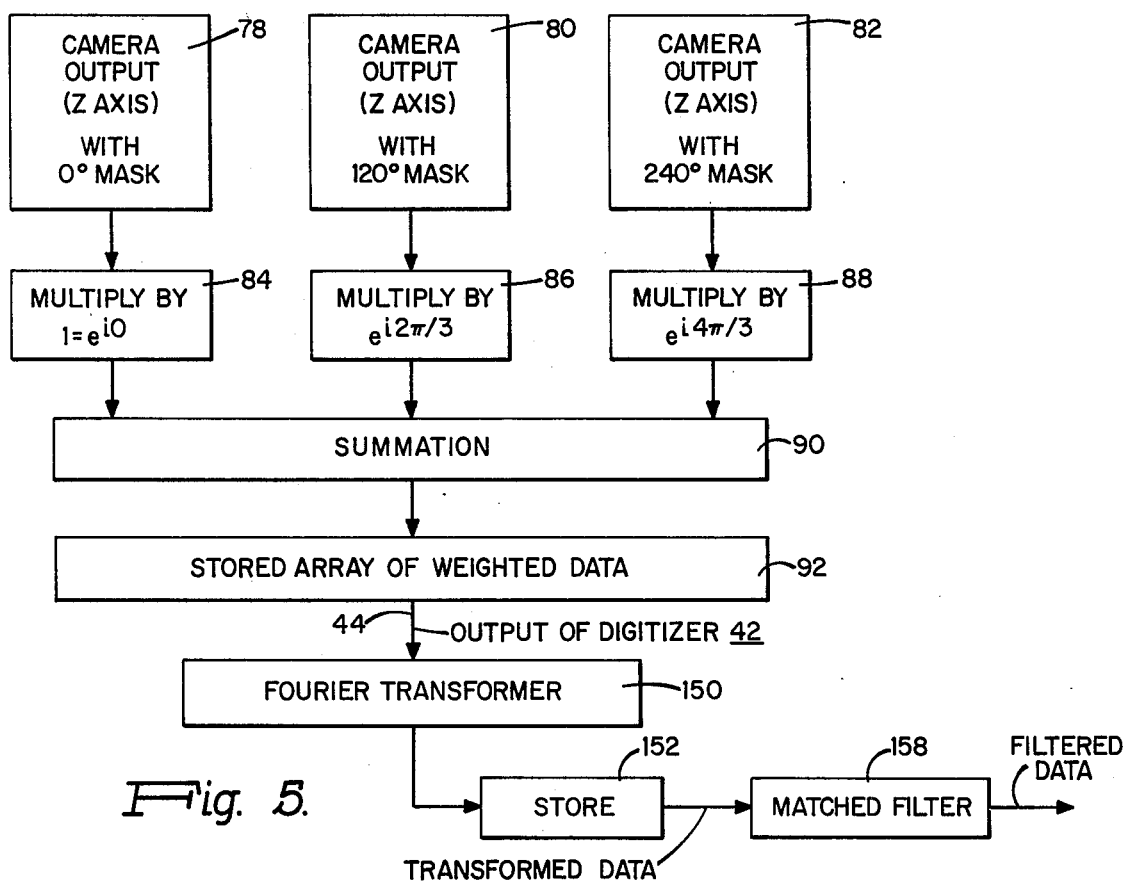
FIG. 5 is a block diagram of the multiplication and summation procedure implemented by the imaging system of FIG. 1 wherein camera data obtained with non diffracting radiation is converted to an array of weighted data having the characteristics of diffracted radiation.

Referring now to FIG. 5, there is seen a block diagram outlining the procedure whereby the signals provided by the camera 28 in response to non-diffracting radiation are converted to an array of numbers having both amplitude and phase data. The blocks 78, 80 and 82 represent the signal provided by the camera 28 in response to a propagation of non-diffracting radiation through the mask assembly 26 for successive positions of the mask assembly 26, these positions being represented respectively, by 0°, 120° and 240°. The Z axis signals from the camera 28 are of equal amplitude and represent the presence of an impinging quanta of radiant energy upon the face of the camera 28. Thus, each Z axis signal may be presumed to be of unit amplitude. The Z axis signals for the blocks 78, 80, and 82 are multiplied respectively by the factors indicated in the blocks 84, 86, and 88. Each Z axis signal is identified by an X coordinate signal and a Y coordinate signal, the X and Y signals being quantized to the number of positions in the array of signals to be processed for forming the image as will be disclosed hereinafter. Thus, the summation provided by the block 90 provides for the summation of all weighted Z axis signals having the same coordinate location in the array of signals, mainly, the same quantized values of the X and Y coordinate signals. Thereby, the summation of block 90 results in a stored array of weighted data in block 92 in which each cell of the array of weighted data contains a pair of numbers representing a complex number the complex number in each cell having been obtained by the summation of weighted Z axis signals having the X and the Y coordinates of that cell. It is noted that the multiplying blocks 84, 86, and 88 each provide multiplications by complex factors the multiplying factor in block 84 being a complex number of unit amplitude and 0° orientation, the multiplying factor of block 86 being of unit magnitude and having an angle of 120° while the multiplying factor of block 88 is a complex number of unit amplitude and has an angle of 240°. The foregoing polar representation of the complex numbers is readily expressed in terms of X and Y coordinates, respectively the real and imaginary parts, for computerized multiplication.

Referring now to FIG. 6, there is shown a detailed diagrammatic representation of the system 20 of FIG. 1. FIG. 6 shows the mask assembly 26, the camera 28, the digitizer 42, the transformer 46 and the display 24 previously seen in FIG. 1. The camera 28 is seen to comprise a scintillator 94 which serves as the face of the camera 28 and is positioned for viewing the rays 30 impinging on the front surface thereof, an array of detectors 96 positioned behind the scintillator 94 for viewing flashes of light emanating therein in response to impinging rays of radiation, and a combiner 98 having resistor summing and weighting circuitry for combining the signals of the detectors 96 to provide the X, Y, and Z signals respectively at the X, Y and Z terminals of the camera 28. The combiner 98 also includes a pulse height analyzer and signal waveform shaping circuitry as is disclosed in the aforementioned Stout patent. The X, Y and the Z terminals are coupled by individual conductors within the line 40 to the digitizer 42.

The digitizer 42 comprises two converters 100 of analog signals to digital signals, a delay unit 102 a counter 104, two switches 106 and 108, two shift registers 110 and 112, a multiplier 114, an adder 116, a memory 118 and a controller 120 for operating the memory 118 and the adder 116. The converters 100 convert the X and Y analog signals from the camera 28 to digital numbers which are seen to be coupled to terminal 122 of the switch 106, the coupling being shown by lines from the output terminals of the converters 100 fanning into the terminal 122. Each converter 100 quantizes the analog signal to a predetermined number of bits, for example, seven bits giving 128 possible values of signal amplitude, the number of possible values of signal amplitude being equal to the number of storage cells in a row or column of the memory 118. Thus, where each of the converters 100 provides seven-bit quantization, the memory 118 is provided with an array of storage cells arranged in rows and columns wherein there are 128 cells in each row and 128 cells in each column. Thus, there are 128 possible positions along the X coordinate of the scintillator 94 and 128 possible positions along the Y coordinate of the scintillator 94 which can be stored in the memory 118. It is understood that the lines coupling the output terminals of each of the converters 100 represent seven electrical conductors with a total of fourteen electrical con-ductors being coupled to terminal 122 of the switch 106. It is further understood that the representation of the switch 106 is schematic only and that the terminal 122 includes fourteen contacts for the fourteen lines, there being fourteen separate switching circuits represented by the switch contactor 124.

The Z axis signal from the camera 28 is utilized for triggering the converters 100 to sample the X and Y signals and convert them to digital numbers. The Z axis signal is further coupled by the delay unit 102 to line 126 which is seen to fan into the line coupled to the terminal 122, and is further coupled to terminal 128 of the switch 106, and to the clock input terminal of the counter 104. The delay of the delay unit 102 is equal to the delay of each converter 100 so that the Z axis signal appears at terminal 122 at the same time as do the digital numbers representing the X and the Y signals. The counter 104 counts pulses of the Z axis signal, the counting being modulo N wherein it is set equal to, for example, sixteen, while other values, such as 32 or 64 may be utilized as explained hereinafter. Upon completion of a count of 16, the counter 104 resets itself to zero and resumes counting pulses of the Z axis signal. The most significant bit (MSB) of the count is presented on line 130 for use by the switch 106 and the controller 120 as will be explained hereinafter.

The registers 110 and 112 in cooperation with the switch 106 provide for buffered storage of the data at terminal 122 so that this data may be entered into the memory 118 at a rate independent of the rate at which it is transmitted from the camera 28 to the terminal 122. With the contactors of the switch 106 in the position shown in the Figure, data from the terminal 122 is written into the register 110 while data in the register 112 is read out via terminal 132 and line 134 to the memory 118. The line 134 is seen to fan out with one branch going to the weighting multiplier 114 while the other branch fans into a line 136 to be coupled via the switch 108 to the memory 118.

The switch 106 is responsive to the MSB of line 130 such that when the MSB is low, this being a low voltage representing a logic state of 0, the contactors of the switch 106 are in the position as shown in the Figure. When the MSB is high, this being a high value or voltage representing a logic state of 1, the switch 106 is activated to drive the contactors to the alternate position whereby the data at terminal 122 is written into the register 112 while data contained within the register 110 is read out via terminal 132. The pulses of the Z axis signal at terminal 128 serve as strobing pulses for activating either the register 110 or the register 112 to shift the digital signals of terminal 122 successively through cells of the register toward its output. It is noted that each of the registers 110 and 112 are constructed in the form of multiple stage shift registers in which the cells of the stages are arranged in parallel with each stage operating individually in the manner of a shift register to store one bit or digit of the data at terminal 122. Thus, in the foregoing example in which the X signal is represented by a seven-bit digital number, the Y signal is represented by a seven-bit digital number, and the pulses of the Z axis signal are in the form of one-bit clock pulses, there is a total of fifteen bits present at terminal 122; thus, each of the registers 110 and 112 have fifteen stages.

The strobing signals for strobing the registers 110 and 112 during the reading out of data therefrom are provided on line 138 via terminal 140 from the controller 120. Thus, in the switch configuration as shown in the figure wherein the MSB is low, the readout strobing pulses are coupled from terminal 140 to the register 112 for reading out data therefrom while the strobing pulses for writing data into the register 110 are coupled thereto from terminal 128. When the MSB is high, the contactors of the switch 106 assume the alternate position wherein the read strobing signal is coupled from terminal 140 to the register 110, and the write strobing signal is coupled from the terminal 128 to the register 112. It is noted that the occurrences of the write strobing signal are at random intervals corresponding to the statistics of the nuclear or atomic energy impinging upon the scintillator 94, while the occurrences of the read strobing signal at terminal 140 are at a regular rate governed by the controller 120.

With respect to the counter 104, in the foregoing example in which the counter 104 counts modulo 16, the MSB is high for a duration of eight counts of the Z axis signal and is low for a count of eight pulses of the Z axis signal. In the event that the counter 104 counts modulo 32, then the duration of the high value and of the low value of the MSB are each equal to sixteen counts. The rate of occurrence of the strobe pulses on line 138 is sufficiently fast so as to permit the reading out of the contents of a shift register during the time frame allotted by the MSB on line 130. It is also noted that the duration of the MSB is sufficient to allow each of the registers 110 and 112 to be completely filled with data points of the shadowgram on the scintillator 94, there being eight data points when the counter 104 counts modulo 16, and there being sixteen data points when the counter 104 counts modulo 32.

The signal on line 134 includes the digital representation of the X coordinate and of the Y coordinate of a point on the shadowgram on the scintillator 94 as well as the Z axis signal indicating the presence of such point, these signals having been obtained from either the register 110 or the register 112. The Z signal is multiplied by a weighting factor in the multiplier 114, the weighting factor being selected by a signal on line 38 in accordance with the aforementioned teachings of FIGS. 1 and 5. Thus, when the positioner 32 has positioned the mask assembly in the 0° position, the multiplier 114 multiplies the Z axis signal by unity and provides a complex number representing the unity multiplication on line 142. When the positioner 32 positions the mask assembly 26 in the 120° position, the multiplier 114 multiplies the incoming Z axis signals by the X and Y coordinates of the complex number of unit magnitude and 120° angle. And, finally, when the positioner 32 positions the mask assembly 26 in the 240° position, the multiplier 114 multiplies the incoming Z axis signals by the X and Y components of a complex number of unit magnitude and angle of 240°, the resultant product of the complex multiplication being applied to line 142.

The signals on line 142 are added to the signals on line 44 by the adder 116. The signals on line 44 are coupled from the output terminal of the memory 118 in response to control signals on line 136 provided by the controller 120. The summation of the incoming weighted Z axis signal with a stored value of a previously occurring weighted Z axis signal by the adder 116 corresponds to the summation step previously referred to in block 90 of FIG. 5.

The summation of the signal on line 44 with the signal on line 142 is accomplished by extracting the signal which is stored in the particular cell of the memory 118 having the X coordinate of its address equal to the X coordinate of the signal on line 142 and the Y coordinate of its address equal to the Y coordinate of the signal on line 142. The X and Y coordinates of the signal on line 142 appear on line 144 to serve as the address of the memory cell and are coupled via the switch 108 along with a control signal of the controller 120 to the memory 118. In this way, all the signals provided by the camera 28 for data at a specific point of the shadowgram are weighted and summed together, the weighted sum appearing in the corresponding cell of the memory 118. The diagram of FIG. 5 is drawn for the simple case in which only one signal appears from each point of the shadowgram on the scintillator 94. In practice, however, many such signals appear from each point of the shadowgram, the amount of such signals depending in a statistical manner on the properties of the subject 22. Thus, points of the shadowgram receiving many such signals appear to be more brightly illuminated by the radiation than points of the shadowgram which receive lesser amounts of radiation. By summing together the signals appearing sequentially at a specific point of the shadowgram, the individual cells of the memory 118 store signals of varying magnitude but with a common phase factor as provided by the weighting in the multiplier 114. Thus, at the conclusion of the exposure of the camera 28 to the radiation for the first position of the mask assembly 26, the data stored in the memory 118 corresponds to the output of the block 84 of FIG. 5.

Considering now the exposure of the camera 28 to radiation during the second position of the mask assembly 26, the previous procedure is repeated except that the Z axis signals on line 134 are now multiplied by the phase factor shown in block 86 of FIG. 5. The foregoing procedure is repeated again with the mask assembly 26 in the third position, this being the 240° position of block 82 of FIG. 5, and the Z axis signals on line 134 are multiplied by the phase factor shown in block 88 of FIG. 5. Thus, with reference to FIG. 6, at the conclusion of the imaging in the first position of the mask assembly 26, the timer 50 via timing signals on line 51 and the terminal T1 activate the controller 120 to discontinue the entry of further data into the memory 118 while the positioner 32 is activated to rotate the mask assembly 26 to the second position. Thereupon, the controller 120 is activated to continue the entry of further data into the memory 118. In view of the summation of weighted signals of block 86 to the weighted signals of block 84 in accordance with their storage locations in the memory 118, the weighted Z axis signals obtained for the second position of the mask assembly 26 are simply added by the adder 116 to the weighted signals previously stored in the cells of the memory 118 having the corresponding X and Y addresses, these previously stored signals having the weighting associated with the first position of the mask assembly 26. Accordingly, at the conclusion of the imaging with the second position of the mask assembly 26, the data stored in the cells of the memory 118 represent the sums of the Z axis signals with the 0° weighting plus the Z axis signals with the 120° weighting. Thereafter, in response to timing signals on line 51 and at terminal T1, the controller 120 and the positioner 32 initiate the summation of Z axis signals with 240° weighting to the previously stored weighted signals in the memory 118 until, at the conclusion of the imaging with the third position of the mask assembly 26, the data stored in the cells of the memory 118 comprises the summation of the outputs of the blocks 84, 86, and 88 of FIG. 5.

The transformer 46 of FIG. 6 begins its operation after the conclusion of the imaging with the third position of the mask assembly 26, the cessation of the entry of new data into the memory 118 and the initiation of the operation of the transformer 46 being accomplished in response to the timing signals of the timer 50. Accordingly, at the conclusion of the imaging with the third position of the mask assembly 26, the timer 50, via terminal T2, activates the switch 108 to switch the contactor 146 to its alternate position for coupling control signals along line 148 from the transformer 46 to the memory 118 in lieu of the control signals previously described with reference to line 136. The transformer 46 is seen to comprise a Fourier transformer 150, three buffer storage units 152, 154, and 156, two filters 158 and 160, an inverse Fourier transformer 162, and a unit 164 for forming the magnitude of complex numbers produced by the transformer 162.

The transformer 150 utilizes well-known computational circuitry for forming the Fourier transform of an array of complex numbers to produce a second array of complex numbers having the same number of terms as the first array and which are the Fourier transform of the first array of complex numbers. The transformer 150 includes circuitry for addressing the memory 118 for extracting complex numbers stored in the cells of the memory 118 in a prescribed order for forming the Fourier transform, the address and control signals utilized for extracting the complex numbers from the memory 118 being coupled thereto via the line 148. The stored complex numbers of the memory 118 are coupled therefrom to the transformer 150 via the line 44. The operation of the transformer 150 is initiated in response to timing signals coupled thereto via terminal T3 from the timer 50. A resulting array of complex numbers representing the Fourier transform is placed in the storage unit 152 by the transformer 150, the strobing of the storage unit 152 to accept these complex numbers being implemented by timing signals at terminal T4. It is noted, that, if desired, the memory 118 could be utilized for the storage of the transformed data in lieu of the storage unit 152 since the memory 118 is no longer being utilized for the reception of new imaging data from the camera 28. However, the storage unit 152 as well as the other storage units 154 and 156 are presented in this embodiment of the invention to more readily show the flow of signals through the successive elements of the transformer 46.

Figure 7:
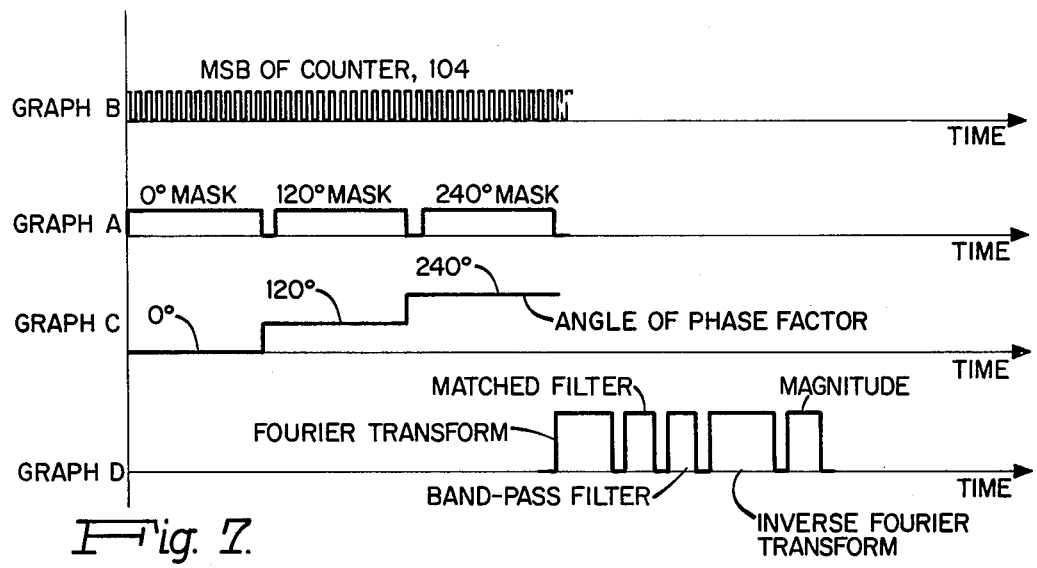
FIG. 7 is a timing diagram depicting the operation of the imaging system disclosed in FIG. 6.

Referring now to both FIGS. 6 and 7, the temporal relationships in the various steps of the operation of the embodiment of FIG. 6 are shown. Graph A shows the successive formation of shadowgrams via the 0° mask, the 120° mask, and the 240° mask. The changing values of the MSB of the counter 104 on line 130 are portrayed in Graph B. The phase factors applied by the multiplier 114 in response to signals on line 38 are shown in Graph C, it being seen that each phase factor is applied in correspondence with the position of each of the masks as shown in Graph A. Subsequent to the conclusion of the 240° masking, the operation of the Fourier transformation by the transformer 150 is initiated as shown in Graph D. The conclusion of the Fourier transformation is attained with the storage of the complex numbers representing the Fourier coefficients in the storage unit 152.

The filter 158 is seen to comprise an address generator 166, a memory 168 having weighting factors therein, and a multiplier 170. The filter 160 similarly comprises an address generator, a memory and a multiplier as does the filter 158. The filter 158 is matched to a Fresnel plate 56 of FIG. 2 or matched to a spiral zone plate 58 of FIG. 3 depending on whether the mask assembly 26A or 26B, respectively, is utilized in the system 20 of FIGS. 1 and 6. The generator 166, in response to timing signals at terminal T5 of the timer 50, addresses the memory 168 to provide filter factors, individual filter factors being selected from the memory 168 in accordance with the locations of the Fourier coefficients in the storage unit 152 for weighting individual ones of these Fourier coefficients. The weighting of the Fourier coefficients is accomplished by the multiplier 170 which multiplies individual ones of the Fourier coefficients by the filter factors coupled to the multiplier 170 from the memory 168.

The matching of the filter 158 to a Fresnel zone plate and to a spiral zone plate will be further explained hereinafter with reference to mathematical equations providing formulae describing these zone plates as well as the filter coefficients obtained therefor and stored in the memory 168. In particular, it is noted that the circular symmetry of the zone plate permits the utilization of a lesser number of filter coefficients than does the situation of the spiral zone plate in which individual sets of filter coefficients are required for different angular orientations of a radius of the spiral pattern.

Figure 8:
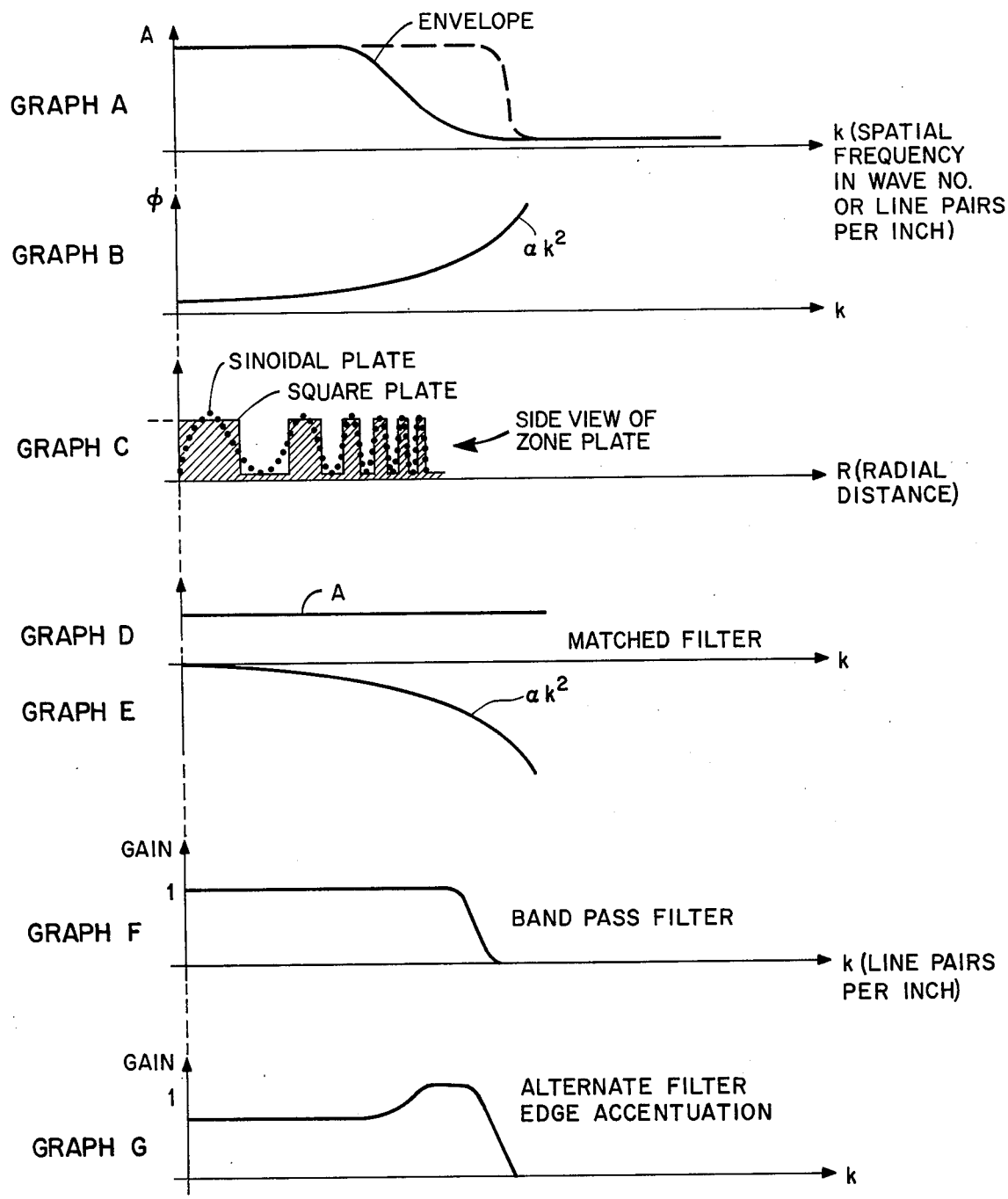
FIG. 8 portrays graphs of phase and amplitude functions related to the generation of a Fresnel mask and the filtering matched thereto.

Referring also to FIG. 8, there is portrayed the amplitude and phase angle of the filter factors, the filter factors being complex numbers for both the filter 158 and the filter 160. Since the operation of the filter 160 is the same as that of the filter 158, it is seen a Fourier coefficient from the storage unit 152 passes through the multiplier 170 wherein it is multiplied by a filter coefficient of the filter 158, whereupon it passes through a multiplier (not shown) of the filter 160 wherein it is multiplied by a filter factor of the filter 160. The resulting products of the multiplications of the Fourier coefficients by the factors of the filters 158 and 160 are stored in an array in the storage unit 154. The filter 160 is in the form of a bandpass filter as will be seen with reference to the graphs of FIG. 8.

In FIG. 8, Graphs A and B show respectively the envelope of the amplitude of a Fresnel plate and the phase characteristic of a Fresnel plate in terms of wave number, or line pairs per inch, which is represented on the horizontal axes of the graphs by the letter $k$. With reference to Graph C which is a schematic drawing of a sectional view of a Fresnel zone plate in which the sectional view is taken along a radius of the plate, it is seen that the spatial frequency of the variations in amplitude increases linearly with increasing radius; similarly, if Graph C is viewed as a pulse train, the repetition frequency of the pulses increases linearly with increasing radius. Graph C shows two embodiments of the zone plate, the solid line being the square form of the plate such as is customarily manufactured while the dotted curve is in the form of a sinusoidal variation in opacity of the plate, the sinusoidal variation being a zone frequently utilized in mathematical descriptions of the zone plate. In practice, mathematical descriptions based on the sinusoidal plate have proved to be sufficiently close approximations to the square plate to give sufficiently accurate predictions of the operation of the square plate for most optical purposes. With reference to the sinusoidal plate, and viewing Graph C as a pulse train, it is seen that the graph portrays a sinusoid of linearly increasing frequency and phase which increases as the square of the spatial frequency, the latter being depicted in Graph B. With reference to Graph A, the amplitude of the sinusoidal pulse is uniform up until the edge of the plate at which time the amplitude falls off to zero.

The filter coefficients of the matched filter 158 of FIG. 6 have amplitude and phase factors as shown respectively in Graphs D and E. Thus, it is seen that the amplitude factors are constant with spatial frequency while the phase is quadratic but with a minus sign so as to cancel out the phase relationship of Graph B. Accordingly, with respect to the Fourier transformation of the transformer 150 of FIG. 6, the frequency domain relationship of the summation of weighted shadowgrams is the relationship described above by Graphs A, B and C. The matched filtering operation removes the variation in phase as a function of spatial frequency with the result that the filtered spectrum at the output of the filter 158 is of uniform amplitude and constant phase. The bandpass filter 160 further modifies the frequency spectrum by either Graph F or Graph G. Graph F is the frequency response of a bandpass filter in which the passband extends from zero frequency to a cutoff frequency, the cutoff frequency being equal to the spatial frequency of the finest, or outermost, zone of the Fresnel zone plate. The response characteristic of Graph F reduces the presence of any system noise in the frequency band above the cutoff frequency. If desired, the filter 160 may be given a passband characteristic such as that of Graph G which accentuates the spectral lines at the higher frequency end of the passband, this resulting in an accentuation of edge lines and fine detail of the image displayed on the display 24.

The filtered signal stored in the storage unit 154 is then processed by an inverse Fourier transformation accomplished by the transformer 162. In response to timing signals at terminals T7 and T8 from the timer 50, the complex numbers representing the spectral components are sequentially shifted via line 172 from the storage unit 154 to the transformer 162, this shifting being accomplished in accordance with control and addressing signals coupled via line 174 from the transformer 162 to the storage unit 154. The inverse transformed components of the image produced by the transformer 162 are coupled to the magnitude unit 164 which converts each of the complex numbers appearing at the output of the transformer 162 to real numbers, the real numbers being formed by taking the magnitude of each of the complex numbers. The real numbers produced by the magnitude unit 164 are stored in the storage unit 156 in response to timing signals coupled from the timer 50 via terminals T9 and T10, the real numbers being stored in a predetermined sequence in an array of cells in the storage unit 156 so that each real number represents the intensity of a point in a reconstructed image of the subject 22 of FIG. 1. The reconstructed image points are then coupled via line 48 to the display 24 to produce a visible image of the subject 22.

Again, with reference to FIG. 8, it is noted that the aforementioned description is related to a Fresnel zone plate. In the case of a spiral zone plate the foregoing description also applies except that, it is to be understood that Graphs, A, B and C describe a spiral plate along a radius thereof having but one orientation. For radii of different orientations, Graph C is modified slightly such that the pulses on Graph C are seen to move outwardly in the direction of increasing radius as the radius is rotated about the axis of the spiral zone plate. And, in accordance with such variation of the pulses in Graph C, the phase relationship of Graph B is varied. Also, the relationship of the phase shown in Graph E is altered to accommodate the variation in Graph B, the alteration in Graph E being accomplished in accordance with the coefficient values as will be described in mathematical equations, hereinafter, wherein separate values are used for each direction of the radius of the spiral zone plate. After the matched filtering has been completed by the filter 158, the filtering of the bandpass filter 160 is the same for both the Fresnel zone plate and the spiral zone plate. The filtering operations of the matched filter 158 and the bandpass filter 160 were also seen in Graph D of FIG. 7, their operation being followed by the inverse transformation and magnitude forming by the transformer 162 and the magnitude unit 164. While the timing diagram of FIG. 7 shows these transformation and filtering operations to take place subsequent to the imaging with the masks as shown in Graph A, an embodiment of the invention has been built wherein the data of the memory 118 in FIG. 6 has been placed on magnetic tape for subsequent transformation by the transformer 46. With the aid of magnetic tape as an additional storage medium, the camera 28 and the mask assembly 26 can be utilized for forming an image of another subject with the operation of the transformer 46 being postponed to a later time.

It is also noted that the storage unit 154 may be replaced by a magnetic tape storage wherein the Fourier transform representation of the filtered image may be stored indefinitely. An advantage of the storage of the Fourier domain representation, as has been observed with holographic imaging, is that the destruction or loss of small portions of the data of the stored array of data is virtually unnoticed in the reconstructed display.

A mathematical description of the Fresnel zone plate is given in an article entitled "Fresnel Zone Plate Imaging of Gamma Rays; Theory" by H. H. Barrett and F. A. Horrigan, published in Applied Optics, Vol. 12, pp. 2686-2702, Nov. 1973. Therein, at page 2689, it is taught that the edge of the nth zone is located at a radius $r_n$ given by $$r_n = r_1 \sqrt{n} \tag{1}$$

where $n$ is an integer 1, 2, ....., and $r_1$ is the radius of the central zone.

The transmission function $g(r)$ of the Fresnel zone plate is given by $$g(r) = \begin{cases} 1 \text{ if } \sin\left(\frac{\pi r^2}{r_1^2}\right) \geq 0 \\ 0 \text{ if } \sin\left(\frac{\pi r^2}{r_1^2}\right) < 0 \end{cases} \tag{2}$$

where $r$ is the radius to a point on the zone plate, and $g(r) = 1$ designates a transparent region while $g(r) = 0$ designates an opaque region.

For the three phase system of Fresnel zone plates of FIG. 2, the above formulation of $g(r)$ is altered to $$g(r) = \begin{cases} 1 \text{ if } \sin\left(\frac{\pi r^2}{r_1^2} + \frac{2m\pi}{3}\right) \geq 0 \\ 0 \text{ if } \sin\left(\frac{\pi r^2}{r_1^2} + \frac{2m\pi}{3}\right) < 0 \end{cases} \tag{3}$$

where $m$ is an integer having values of 0, 1 or 2 corresponding respectively to phase factors of 0°, 120° and 240°.

For the spiral zone plate of FIG. 3 the aforementioned transmission function is given in polar coordinates relative to the axis of the spiral, namely:

$$g(r,\theta) = \begin{cases} 1 \text{ if } \sin\left(\frac{\pi r^2}{r_1^2} + \theta + \frac{2m\pi}{3}\right) \geq 0 \\ 0 \text{ if } \sin\left(\frac{\pi r^2}{r_1^2} + \theta + \frac{2m\pi}{3}\right) < 0 \end{cases} \tag{4}$$

where $\theta$ is shown in FIG. 3.

The coefficients in the matched filter 158 of FIG. 6 are the real and imaginary parts of the Fourier transformation, $F(f)$, in the case of the Fresnel mask system of FIG. 2 where $$F(f) = [F(g(r))]^* = e^{j\pi r_1^2(s_1+s_2)^2(1/s_1)^2 f^2} = e^{j\alpha f^2} \tag{5}$$

and * represents the complex conjugate, $f$ is the spatial frequency in line pairs per unit of length, and $s_1$ and $s_2$ are shown in FIG. 6, respectively, as the distances from zone plate to subject and to scintillator. By selecting a set of coefficients in accordance with a predetermined value of $\alpha$, this being dependent on $s_1$ and $s_2$, the display 24 of FIG. 6 presents the image of a specific plane (or tomographic slice) through the subject 22. Sets of the coefficients for various values of $\alpha$ are selected by a focusing knob 176 on the address generator 166 in the matched filter 158.

The matched filter 158 also stores coefficients for the case of the spiral zone plate of FIG. 3, the coefficients being the real and imaginary parts of $$F(f) = e^{j\pi[r_1(\theta)]^2(s_1+s_2)^2(1/s_1)^2 f^2} = e^{j\alpha(\theta) f^2} \tag{6}$$

in which case $r$ has monotonically increasing values with increasing $\theta$ as shown in FIG. 3.

The values of the individual coefficients stored in the memory 168 differ in accordance with the values of $f$. The value of $f$ in each coefficient is set in accordance with the specific spectral line which is to be multiplied by the coefficient. For example, the digital number representing the magnitude of a spectral line from the transformer 150 at 8 line-pairs per centimeter would be multiplied by a coefficient in which the value of $f$ is at 8 line-pairs per centimeter.

Figure 9:
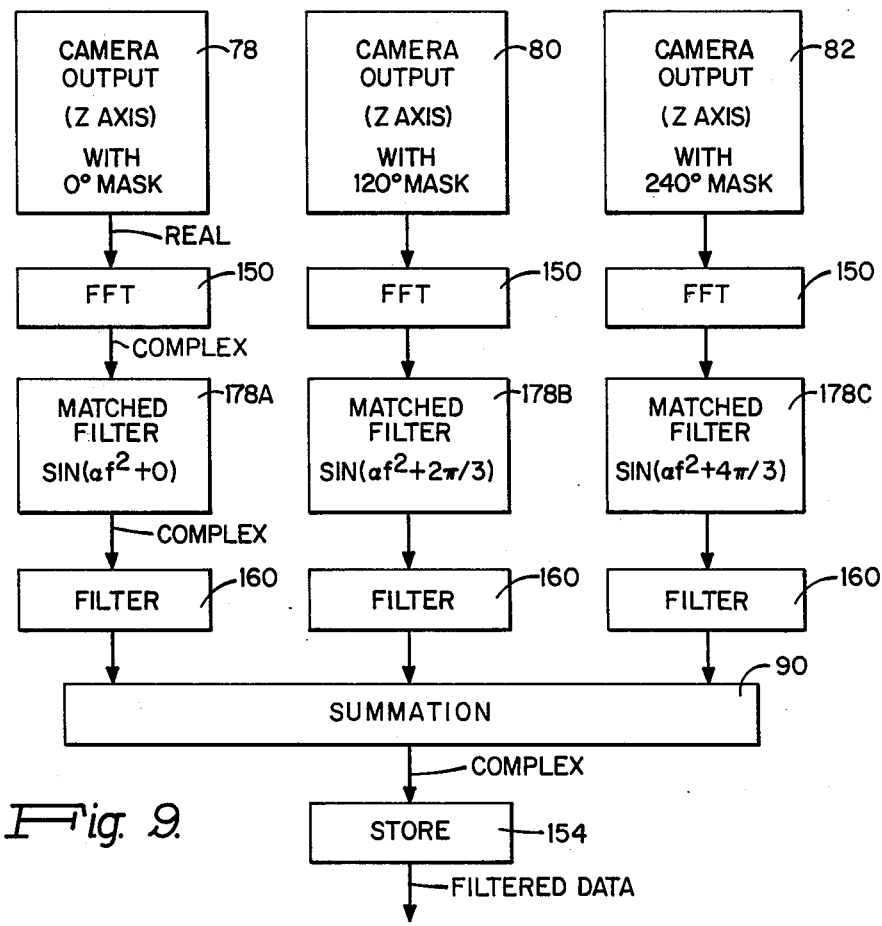
FIG. 9 is an arithmetic procedure alternate to that of FIG. 5 which teaches the placement of the phase factors in a matched filtering operation.

Referring now to FIG. 9, there is shown a block diagram of a mathematical procedure which is alternate to the procedure disclosed previously with reference to FIG. 5. As was seen above, the outputs of the cameras for the three mask positions, as designated by the blocks 78, 80, and 82, are multiplied by the phase factors, respectively, of blocks 84, 86, and 88 whereupon they are summed together by block 90. The summed data is then transformed by the Fourier transformer 150, as disclosed previously with reference to FIG. 6, to appear in the storage unit 152 as seen in both FIGS. 5 and 6.

The mathematical operation, as outlined in FIG. 5, shows a summation followed by a Fourier transformation, the summation being accomplished by block 90 and the Fourier transformation being accomplished by the transformer 150. As is well known, the Fourier transformation of a summation of signals is equal to the summation of the individual Fourier transformations of the respective signals. Also, the phase factors introduced by the blocks 84, 86, and 88 appear as constants in the Fourier transformation and, accordingly, may be applied to the signals either before or after the Fourier transformation. Furthermore, the filtering operation of the filter 158 of FIGS. 5 and 6 is a linear operation in which the filtered summation of signals is equal to the summation of the filtered signals. In view of these mathematical considerations, the diagram of FIG. 5 may be altered to that shown in FIG. 9.

As seen in FIG. 9, the blocks 78, 80 and 82, also seen in FIG. 5, provide the Z axis output signal of the camera for each of the three mask positions of FIG. 2 or FIG. 3. The output signals from the blocks 78, 80, and 82 are applied to Fourier transformers such as the transformer 150 of FIG. 6 to provide a fast Fourier transformation (FFT), the signals as transformed by the transformers 150 being processed by a matched filtering operation, respectively, by blocks 178A-C. The filtered signals provided by the blocks 178A-C may be further filtered by the bandpass filters 160 previously seen in FIG. 6, and are then summed together and stored in the storage unit 154, also seen in FIG. 6.

As noted in FIG. 9, the digital numbers provided at the inputs to the transformers 150 are real numbers while the digital numbers appearing at the outputs of the transformers 150 are complex numbers. The mathematical expressions for the values of the coefficients to be applied as multipliers in each of the filters are shown, respectively, in each of the blocks 178A-C and each is seen to be the real part of the complex number shown above in Equation 5. In addition, the argument of the sinusoid for each of the blocks 178A-C contains a phase angle, not seen in Equation 5, these phase angles being identical to the angle of the phase factors disclosed, respectively, in blocks 84, 86, and 88 of FIG. 5. The digital number appearing at the output of each of the blocks 178A-C is a complex number, the filter coefficients serving as scale factors for multiplying the real and imaginary parts of each complex number appearing at the input to each block 178A-C. Also, the result of the summation at block 90 is a complex number.

It is noted that while the phase factors of FIG. 5 are absent, in FIG. 9, the coefficients of each of the blocks 178A-C are specifically matched to each of the three positions of the mask assembly 26 of FIG. 1. It has also been found that the embodiment of the invention represented by FIG. 9 produces more precise images than that of FIG. 5 since the filtering operation of the blocks 178A-C tend to suppress noise better than the filter 158 of FIGS. 5 and 6. The discussion presented above for obtaining the coefficients of the filter 158 for both the Fresnel mask and the spiral mask in terms of the value of the parameter $\alpha$ applies also to the coefficients of the blocks 178A-C.

Figure 10:
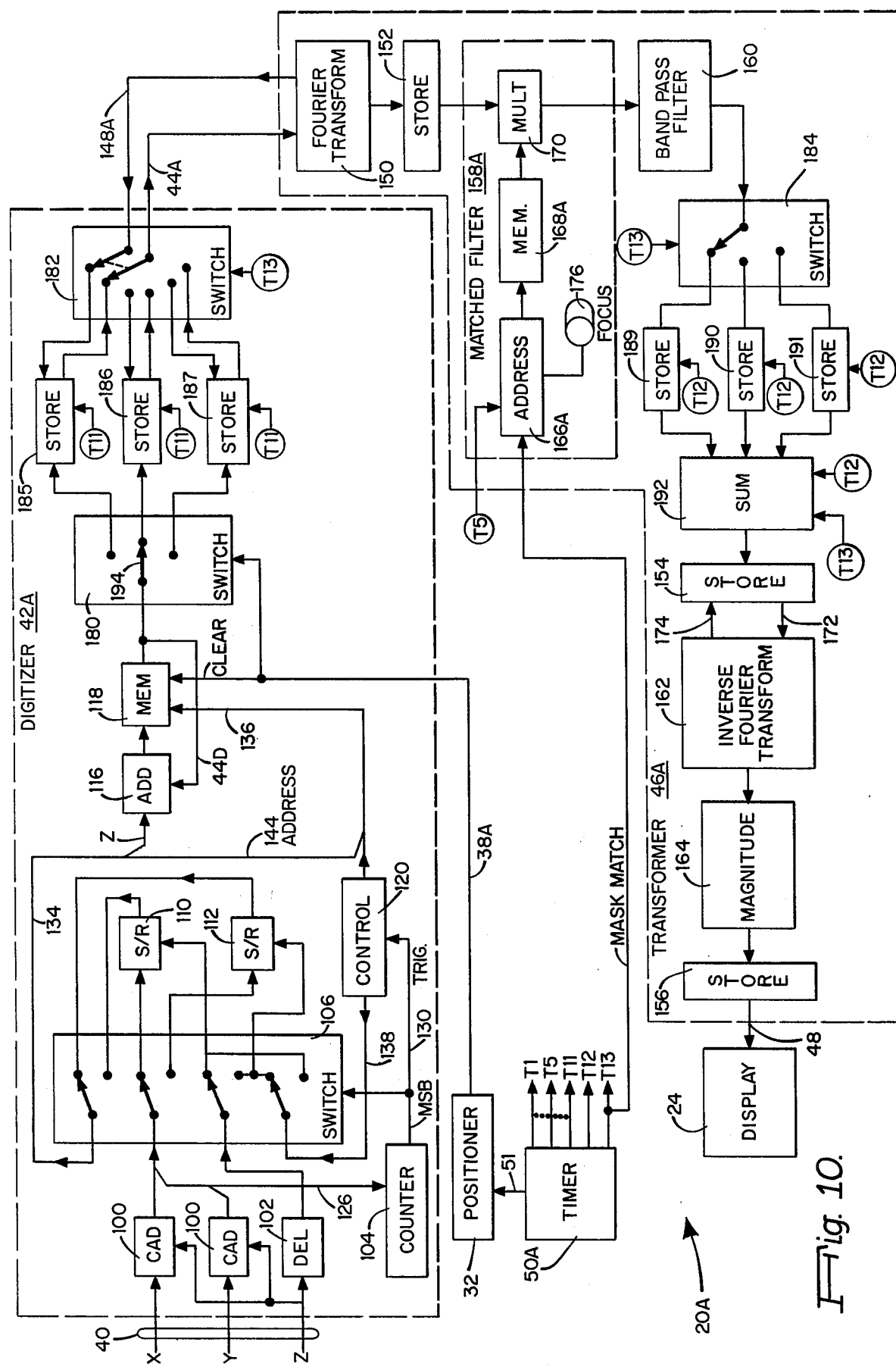
FIG. 10 shows a portion of FIG. 6 and an alternate embodiment thereof corresponding to the procedure of FIG. 9.

Referring now to FIG. 10, there is seen a portion of the block diagram of FIG. 6 which has been modified to operate in the manner taught by FIG. 9. The controller 120 is seen coupled to the memory 118 via line 136, previously seen in FIG. 6. Since the phase factors of the blocks 84, 86, and 88 of FIG. 5 which were used as the weighting factors by the multiplier 114 of FIG. 6 are not used in the embodiment of FIG. 10, the line 134 of FIG. 6 is coupled directly from the switch 106 to the adder 116 in FIG. 10. Also shown in FIG. 10 are the transformer 150, the storage unit 152, the bandpass filter 160 and the storage unit 154 which were previously seen in FIG. 6. The matched filter 158 of FIG. 6 has been replaced by a modified form of the filter identified as 158A in FIG. 10, the filter 158A having an enlarged memory 168A which is addressed by an address generator 166A and has sufficient storage capacity for storing the coefficients of the three blocks 178A-C of FIG. 9.

Also shown in FIG. 10 are switches 180, 182, and 184, storage units 185, 186, 187, 189, 190 and 191, and a summer 192. In FIG. 6, output signals of the positioner 32 are shown coupled via line 38 to the multiplier 114, while in FIG. 10, the same output signals are shown coupled via line 38A to the switch 180. Also, the timer 50 of FIG. 6 is replaced by the timer 50A of FIG. 10, the timer 50A having additional output timing signals at terminals T11, T12, and T13 and providing the timing signals for synchronizing the operation of the elements of the system 20A of FIG. 10.

The operation of the system 20A of FIG. 10 is the same as that of FIG. 6 except for the modifications thereof as taught above with reference to FIG. 9 for accomplishing the Fourier transformation and matched filtering of the signals of the camera 28 individually for each position of the mask assembly 26. Thus, for the first position of the mask assembly 26 of FIG. 6, the Z axis signals coupled via the switch 106 and line 134 to the adder 116 are summed together with signals stored in the memory 118 at the corresponding locations of the previously occurring Z axis signals, the output of the memory 118 being coupled to the input of the adder 116 via line 44D in the manner previously taught with reference to line 44 of FIG. 6.

The switch 180 is operated by signals on line 38A so that the arm 194 couples signals from the memory 118 sequentially to the storage units 185, 186, and 187 corresponding to the sequential positions, namely, the positions at 0°, 120° and 240°, of the mask assembly 26. The line 38A is also coupled to the memory 118 wherein the leading edge of the signal on line 38A serves to clear the memory 118. Thus, at the inception of each position of the mask assembly 26, the memory 118 is cleared to begin the summation and storage of signals for the new position of the mask assembly 26, and the arm 194 of the switch 180 is positioned to couple the stored summations of Z axis signals to the corresponding one of the storage units 185–187. The data from the memory 118 is clocked into the storage units 185–187 by clock pulse signals at terminals T11, the timer 50A providing the clock signals at terminal T11 prior to signalling the positioner 32, via line 51, to reposition the mask assembly 26.

The transformer 150 operates in FIG. 10 in the same manner as taught previously with reference to FIG. 6 and receives signals on line 44A in FIG. 10 in a manner analogous to that taught with reference to line 44 of FIG. 6. Addresses to the storage units 185–187 are transmitted from the transformer 150 along line 148A in FIG. 10 in the manner taught previously with reference to the addressing of the memory 118 via line 148 in FIG. 6. The timer 50A operates the switch 182 via terminal T13 to successively couple the storage units 185–187 to the transformer 150 so that the transformer 150 can successively calculate the set of Fourier spectral terms for the imaging data stored in the three storage units 185–187. The terminal T13 as well as the terminal T5 of the timer 50A are both coupled to the address generator 166A for addressing the memory 168A to provide filter coefficients for the filter 158A according to those of the blocks 178A-C of FIG. 9. The terminal T13 provides signals which select sequentially each of the three sets of coefficients having the phase factors respectively, of the blocks 178A-C. The terminal T5 provides the addressing signals to couple individual ones of the coefficients of the selected set of coefficients from the memory 168A to the multiplier 170 according to the respective blocks 178A-C. The addressing of the individual coefficients via the signal at terminal T5 is accomplished in the manner disclosed previously with reference to FIG. 6.

The signal at terminal T13 of the timer 50A also operates the switch 184 in synchronism with the switch 182 to couple the transformed and filtered signals of the transformer 150 to corresponding ones of the storage units 189–191, the digital signals being clocked into the storage units 189–191 via clock signals at terminal T12. Thus, the signals of the storage unit 185 upon being transformed and filtered are stored in the storage unit 189, the signals of the storage unit 186 upon being transformed and filtered are stored in the storage unit 190, and the signals of the storage unit 187 upon being transformed and filtered are stored in the storage unit 191. By way of alternative embodiments, it is understood that the several storage units 185–187 and 189–191 may be replaced by a single larger storage unit (not shown) including appropriate addressing and switching circuitry to permit the reuse of storage area, previously utilized for storing the camera data of the memory 118, for storing the filtered data of the matched filter 158A. It is also noted that the bandpass filter 160 has a filter characteristic which is invariant with the positions of the switches 182 and 184 and, accordingly, in view of the linearity of the filtering operation of the filter 160, may, alternatively, be placed between the summer 192 and the storage unit 154 in lieu of its placement between the filter 158A and the switch 184.

The operation of the storage unit 152 and the bandpass filter 160 of FIG. 10 is the same as that taught previously with reference to FIG. 6. The signals at terminal T13 are also utilized for synchronizing the operation of the summer 192 for summing together the signals stored in the storage units 189–191, the clock pulse signals at terminal T12 serving to clock the stored digital numbers from the storage units 189–191 into the summer 192. The summed signals from the summer 192 are then clocked into the storage unit 154 in the manner previously disclosed with reference to FIG. 6. The remaining operations of the system 20 including the inverse transformation by the transformer 162, the taking of the magnitude by the magnitude unit 164, and the operation of the storage unit 156 and the display 24 are the same for the systems 20 and 20A of FIGS. 6 and 10. Accordingly, the system 20 of FIG. 6 and the modified embodiment of that system, the system 20A of FIG. 10, produce the same type image on the display 24, however, the modified embodiment of FIG. 10 produces a more precise image due to the reduction of noise provided by the three separate matched filtering operations of the filter 158A of FIG. 10. The system 20A of FIG. 10 also produces increased clarity to tomographic images, as compared to the tomographic images produced by the system 20 of FIG. 6, in that the system 20A further attenuates the influence of sources of radiation sited in planes above and below the plane of the subject which is being imaged.

It is understood that the above described embodiments of the invention are illustrative only and that modifications thereof may occur to those skilled in the art. Accordingly, it is desired that this invention is not to be limited to the embodiments disclosed herein but is to be limited as defined by the appended claims.

What is claimed is:

1. A system for imaging non-diffracting radiation comprising:
    a detector of such radiation incident thereupon from a subject, said detector including means for providing an array of signals representing locations of impingement of said radiation upon said detectors;
    means for masking such radiation propagating from said subject to said detector, said masking means providing a sequence of spatial modulation patterns to said radiation, the modulation of said radiation by each of said spatial modulation patterns varying the magnitudes of signals of said array of detector signals in accordance with respective ones of said modulation patterns; and
    means coupled between said detector and said masking means for digitally filtering signals of said array with weighting factors corresponding to individual ones of said modulation patterns to provide an image of said subject.

2. A system according to claim 1 wherein said detector includes means for digitally quantizing the locations of impingement of said radiation upon said detector, said digital quantization corresponding to the addresses of signals of said array of detector signals.

3. A system according to claim 2 wherein said filtering means includes means for weighting signals of said array of signals with phase factors corresponding to the modulation patterns of said masking means, said filtering means further comprising means for summing together signals of said array of signals having a common address.

4. A system according to claim 3 wherein said filtering means including means coupled to said summing means for forming the Fourier transform of the summed signals in said array of signals, and means for multiplying spectral components produced by said transforming means with filter factors of a filter matched to one of said modulation patterns.

5. A system according to claim 4 wherein said filtering means further comprises means coupled to said multiplying means for providing an inverse Fourier transformation of an array of signals produced by said multiplying means, output signals of said inverse transformation means having magnitudes representing magnitudes of image points of said display.

6. A system according to claim 1 wherein said filtering means includes means for providing a Fourier transformation of successive signals of said array of signals, said successive signals being obtained with successive ones of said modulation pattern.

7. A system according to claim 6 wherein said filtering means further comprises means coupled to said Fourier transformation means for multiplying spectral terms of said transformation means by filter factors of filters matched respectively to said sequence of spatial modulation patterns.

8. A system according to claim 7 wherein said filtering means further comprises means coupled to said multiplying means for providing an inverse Fourier transformation of an array of signals produced by said multiplying means, the magnitudes of signals of said inverse transformation being the magnitudes of points of said image of said subject.

9. A system according to claim 8 wherein said factors of said multiplying means are complex numbers having phase angles corresponding to said modulation patterns of said masking means.

10. A system according to claim 9 wherein said detector includes means for quantizing the locations of points of impingement of said radiation upon said detector, said quantization being represented by pairs of digital numbers for addressing signals of said array of signals.

11. A system according to claim 10 wherein said filtering means includes means coupled to said quanitzation means of said detector for summing signals of said array having common addresses.

12. A system according to claim 9 wherein said filtering means includes means coupled to said multiplying means for altering the values of said filter factors in accordance with the relative spacings between said masking means and a plane of said subject and said detector for bringing said plane of said subject into focus in said image.

13. A system according to claim 9 wherein said masking means includes means coupled to said multiplying means of said filtering means for simultaneously altering said modulation pattern and the filter factors of said matched filter.

14. A system according to claim 7 wherein said modulation patterns of said masking means comprise a set of Fresnel patterns wherein the sets of radii of successive rings in corresponding ones of the Fresnel patterns are in accord with a mathematical formulation having differing phase factors in an argument of the formulation.

15. A system according to claim 7 wherein the modulation pattern of said masking means is in the form of a spiral, successive modulation patterns of said sequence of modulation patterns being obtained by rotating said spiral about an axis thereof.

16. A system for imaging non-diffracting radiation comprising:
a detector positioned for receiving radiant energy radiated by a source of said energy;
masking means positioned between said source and said detector, said masking means casting a shadow of a mask upon said detector by such radiant energy emanating from a point of said source, the wavelength of said radiant energy being much smaller than the dimensions of said mask so that substantially no diffraction occurs, the radiant energy from a plurality of points of said source producing a shadowgram upon said detector;
said masking means including means for altering said shadowgram for casting a sequence of altered shadowgrams upon said detector;
said detector producing an array of signals identifying individual points in one of said shadowgrams, a plurality of said signal arrays being produced in response to a plurality of shadowgrams;
means for multiplying signals of said detector by phase factors to produce an array of products, said phase factors identifying individual ones of said shadowgrams; and
means coupled to said multiplying means for summing said products in said array of products to produce an array of sum signals, said array of sum signals having the format of a diffraction pattern obtained by illuminating said mask of said masking means by radiant energy having a wavelength commensurate with dimensions of said mask.

17. A system for imaging non-diffracting radiation comprising:
a detector positioned for receiving radiant energy radiated by a source of said energy;
masking means positioned between said source and said detector, said masking means casting a shadow of a mask upon said detector by such radiant energy emanating from a point of said source, the wavelength of said radiant energy being much smaller than the dimensions of said mask so that substantially no diffraction occurs, the radiant energy from a plurality of points of said source producing a shadowgram upon said detector;
said masking means including means for altering said shadowgram for casting a sequence of altered shadowgrams upon said detector;
said detector producing an array of signals identifying individual points in one of said shadowgrams, a plurality of said signal arrays being produced in response to a plurality of shadowgrams;
means for multiplying signals of said detector by coefficients of a matched filter to produce an array of products, said matched filter being matched to a shadow casting pattern of said masking means;
means coupled to said multiplying means for converting said array of products to an image of said source; and wherein
said multiplying means provides a plurality of sets of said coefficients, each set of coefficients pertaining to a filter matched to a corresponding one of a plurality of masking patterns of said masking means, there being one of said masking patterns corresponding to each of said altered shadowgrams.

18. A system according to claim 17 wherein said converting means comprises means for transforming, via an inverse Fourier transformation, said array of products to produce said image.

19. An imaging system comprising:
means for detecting a shadowgram of a subject;
means for altering said shadowgram to provide a sequence of said shadowgrams, each of said shadowgrams being one of a family of shadowgrams having common mathematical properties;
means coupled to said detecting means for obtaining spectral components of said shadowgrams;
means coupled to said spectral component means for filtering a detected shadowgram by a filter matched to said shadowgram, said filtering means including means for filtering successive ones of said shadowgram by filters matched to individual ones of said successive shadowgrams; and means for summing together corresponding points of said filtered shadowgrams to provide an image of said subject.

20. A system according to claim 19 wherein said filtering means includes means for altering filter factors of said filtering means in accordance with the relative spacings between said masking means and said subject and said detecting means to focus said image upon a plane of said subject.

21. An imaging system comprising:

means for detecting a shadowgram of a subject;

means for varying said shadowgram to provide a sequence of shadow patterns of a common family of said patterns;

means coupled to said detecting means for mathematically identifying individual ones of detected shadowgrams in accordance with variations in said shadowgrams produced by said varying means;

means coupled to said identifying means for summing together said mathemtically identified shadowgrams;

means coupled to said summing means for obtaining spectral components of a summation of shadowgrams produced by said summing means; and means coupled to said spectral component means for filtering said summation of shadowgrams by a filter matched to one of said sequence of shadowgrams to provide an image of said subject.

22. A system according to claim 21 wherein said filtering means includes means for altering said filtering in accordance with the relative spacings between said masking means and said subject and said detecting means to focus said image upon a plane of said subject.

23. In combination:

means for detecting a shadowgram of a subject:

means for altering said shadowgram to provide a sequence of shadow pattern of a common family of said patterns;

means coupled to said detecting means for signaling the locations of individual points of detected shadowgrams, said location signaling means including means for quantizing said signals to provide an array of location signals;

means for summing together points of said shadowgrams having a common location;

means coupled to said summing means for forming the spectral components of a shadowgram; and means coupled to said spectral component means for filtering said summation of points by a filter matched to one of said sequence of shadowgrams to provide an image of said subject.

* * * * *